M. E. HUGHES.
BOX FOR SEED PLANTERS.
APPLICATION FILED OCT. 24, 1911.

1,039,060.

Patented Sept. 17, 1912.

Witnesses
M. H. Gannett
James Foley

Inventor
Michael E. Hughes
By Victor J. Evans
Attorney

UNITED STATES PATENT OFFICE.

MICHAEL E. HUGHES, OF MANTENO, ILLINOIS.

BOX FOR SEED-PLANTERS.

1,039,060.　　　　Specification of Letters Patent.　　Patented Sept. 17, 1912.

Application filed October 24, 1911. Serial No. 656,379.

*To all whom it may concern:*

Be it known that I, MICHAEL E. HUGHES, a citizen of the United States, residing at Manteno, in the county of Kankakee and State of Illinois, have invented new and useful Improvements in Boxes for Seed-Planters, of which the following is a specification.

This invention relates to boxes, hoppers or the like for such agricultural implements as seed planters, the object of the invention being to provide a sight opening in the seed planter which may be disposed to full view of the driver or operator of the planter so that he can readily ascertain whether the hopper contains seed sufficient for the desired distribution upon the field.

Figure 1:
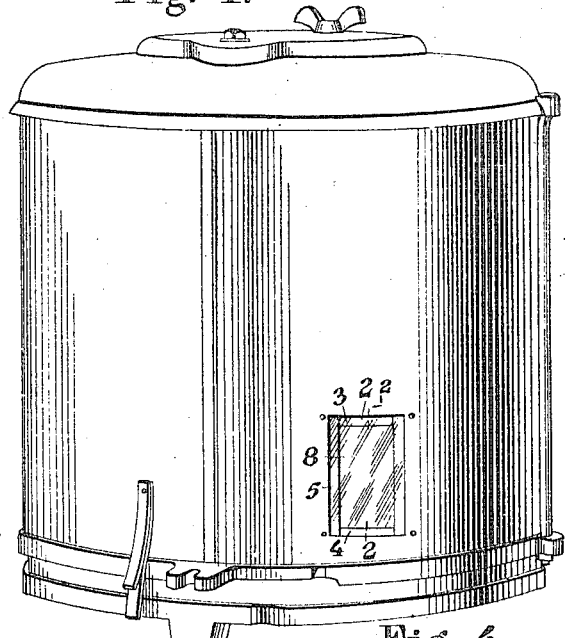
Figure 2:
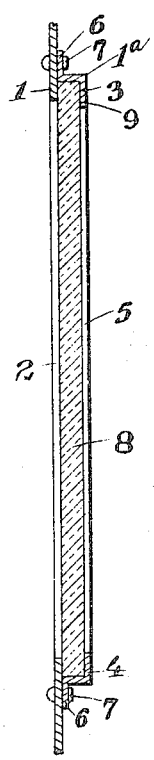
Figure 3:
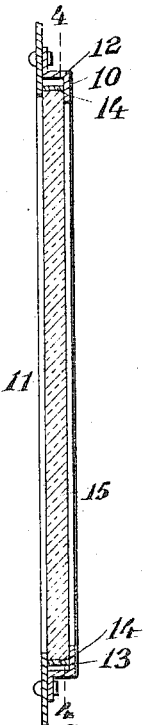
Figure 4:
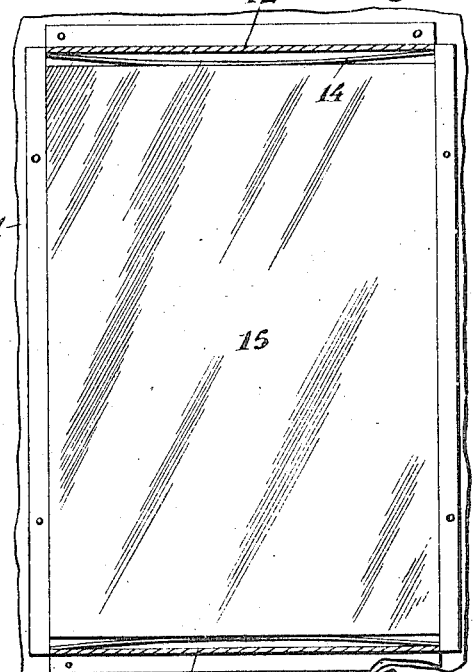

In the drawing, forming a portion of this specification and in which like numerals of reference indicate similar parts in the several views:—Figure 1 is a perspective view of the seed box. Fig. 2 is a section therethrough on line 2—2 of Fig. 1. Fig. 3 is a view similar to Fig. 2 showing a slightly modified form of the invention. Fig. 4 is a section on line 4—4 of Fig. 2.

The box 1 shown in Figs. 1 and 2 of the drawing may be of any suitable well known construction which is designed to contain the grain for distribution to the feed mechanism of the planter, (not shown). The box is provided adjacent to its lower end and at one side with a sight opening 2. At one side of the opening the box has secured thereto a frame 1ª which comprises the upper bar 3, the lower bar 4 and the side vertical bars 5. The vertical bars 5 are of rectangular configuration in cross section and they are disposed with relation to the bars 3 and 4 so as to close the ends thereof. The bars 3 and 4 are provided with attaching flanges 6 which are riveted or otherwise suitably secured, at 7, to the walls of the box 1. The sight opening 2 in the box 1 is closed by a transparent member 8 of glass or the like. The bars 3 and 4 are of angle iron construction so that each presents a longitudinal channel 9. The transparent member 8 is confined in the channel portions 9 of the bars 3 and 4 by the vertical side members 5 of the frame 1ª.

In practice, the hopper or grain box is arranged on the planter so that the sight opening will be exposed to full view of the driver. As the planter is driven through the field the driver or operator will have full view of the planter and can thereby readily ascertain as to whether or not it contains grain required for the desired distribution upon the field.

In the modified form of the invention shown in Figs. 3 and 4, a frame 10 which is similar in construction to the hereinbefore described frame is disposed at one side of the sight opening 11. The channel bars 12 and 13 in the modified form of the frame are provided with flat leaf springs or other suitable equivalent well known yieldable elements 14 which are designed to bear against the edges of the transparent member 15 so as to prevent the member from breaking under the vibrations of the machine as it is propelled across the field.

I claim:

A grain box having an opening therein, a frame for said opening, said frame comprising upper and lower bars of angle iron construction and vertical side bars adapted to close the ends of the upper and lower bars, the said upper and lower angle iron bars presenting channels, means located in the channel members, a transparent member extending into the channel members and engaged against the said means located therein whereby any accidental breakage of the transparent material is prevented under the vibrations of the machine as it is propelled across the field.

In testimony whereof I affix my signature in presence of two witnesses.

MICHAEL E. HUGHES.

Witnesses:
　LOUISE M. LA ROCQUE,
　JOHN FRANCIS WRIGHT.